US012558884B2

(12) United States Patent
Iida et al.

(10) Patent No.:  US 12,558,884 B2
(45) Date of Patent:       Feb. 24, 2026

(54) METHOD FOR PRODUCING LAMINATE AND HEATING ELEMENT, AND DEFROSTER

(71) Applicant: MITSUI MINING & SMELTING CO., LTD., Tokyo (JP)

(72) Inventors: Hiroto Iida, Ageo (JP); Makoto Hosokawa, Ageo (JP); Misato Mizoguchi, Ageo (JP); Shinya Hiraoka, Ageo (JP); Toshiyuki Shimizu, Ageo (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 205 days.

(21) Appl. No.: 18/277,673

(22) PCT Filed: Feb. 8, 2022

(86) PCT No.: PCT/JP2022/004842
§ 371 (c)(1),
(2) Date: Aug. 17, 2023

(87) PCT Pub. No.: WO2022/176698
PCT Pub. Date: Aug. 25, 2022

(65) Prior Publication Data
US 2024/0131832 A1     Apr. 25, 2024
US 2024/0227377 A9     Jul. 11, 2024

(30) Foreign Application Priority Data

Feb. 19, 2021     (JP) ................................. 2021-025643

(51) Int. Cl.
| | |
|---|---|
| *B32B 37/18* | (2006.01) |
| *B32B 15/082* | (2006.01) |
| *B32B 15/20* | (2006.01) |
| *B32B 27/28* | (2006.01) |
| *B32B 37/06* | (2006.01) |
| *B32B 37/10* | (2006.01) |
| *H05B 3/86* | (2006.01) |

(52) U.S. Cl.
CPC .......... *B32B 37/182* (2013.01); *B32B 15/082* (2013.01); *B32B 15/20* (2013.01); *B32B 27/28* (2013.01); *B32B 37/06* (2013.01); *B32B 37/10* (2013.01); *H05B 3/86* (2013.01); *B32B 2307/302* (2013.01); *B32B 2307/538* (2013.01); *B32B 2307/7376* (2023.05); *B32B 2307/748* (2013.01); *B32B 2309/02* (2013.01); *B32B 2309/12* (2013.01); *B32B 2311/12* (2013.01); *B32B 2329/06* (2013.01); *B32B 2605/00* (2013.01)

(58) Field of Classification Search
CPC ....... B32B 37/182; B32B 37/06; B32B 37/10; B32B 2307/302; B32B 2307/538; B32B 2311/12; B32B 2329/06; B32B 2605/00; B32B 2038/0092; B32B 15/082; B32B 15/20; B32B 27/28; B32B 27/30; B32B 2307/7376; B32B 2307/748; B32B 2309/02; B32B 2309/12; B60J 10/60; H05K 3/384; H05K 3/385; H05K 3/388; H05B 3/86; H05B 3/12; H05B 3/84; H05B 3/20; H05B 2203/017; H05B 2214/02
See application file for complete search history.

(56) References Cited

U.S. PATENT DOCUMENTS

| | | | | |
|---|---|---|---|---|
| 3,293,109 | A | * | 12/1966 | Luce ...................... H05K 3/384 |
| | | | | 428/209 |
| 2020/0017675 | A1 | | 1/2020 | Isoue et al. |
| 2020/0023620 | A1 | | 1/2020 | Isoue et al. |

FOREIGN PATENT DOCUMENTS

| | | | | |
|---|---|---|---|---|
| JP | 11-10794 | A | 1/1999 | |
| JP | 2006-159900 | A | 6/2006 | |
| JP | 2006-218855 | A | 8/2006 | |
| JP | 4354271 | B2 | 10/2009 | |
| JP | 2015-193884 | A | 11/2015 | |
| JP | 2018-35036 | A | 3/2018 | |
| JP | 2018-161889 | A | 10/2018 | |
| JP | 2019-142763 | A | 8/2019 | |
| WO | 2014/024994 | A1 | 2/2014 | |
| WO | WO-2016117512 | A1 * | 7/2016 | ............. B32B 15/08 |
| WO | 2017/090386 | A1 | 6/2017 | |
| WO | WO-2021157363 | A1 * | 8/2021 | ............. B32B 15/08 |

* cited by examiner

*Primary Examiner* — John L Goff, II
(74) *Attorney, Agent, or Firm* — GREENBLUM & BERNSTEIN, P.L.C.

(57)             ABSTRACT
Provided is a method for manufacturing a laminate that is excellent in adhesion between the copper foil and the resin film while using a polyvinyl acetal resin having low reactivity with the copper foil. This method includes the steps of providing a copper foil having on at least one side a treated surface on which an amount of metal components is 30 atomic % or more and 40 atomic % or less, and attaching or forming a polyvinyl acetal resin film on the treated surface of the copper foil to form a laminate. The amount of metal components is a proportion of Cr, Ni, Cu, Zn, Mo, Co, W, and Fe in a total amount of N, O, Si, P, S, Cl, Cr, Ni, Cu, Zn, Mo, Co, W, and Fe when the treated surface is subjected to elemental analysis by X-ray photoelectron spectroscopy (XPS).

13 Claims, No Drawings

METHOD FOR PRODUCING LAMINATE AND HEATING ELEMENT, AND DEFROSTER

TECHNICAL FIELD

The present invention relates to methods for manufacturing a laminate and a heating element, and a defroster.

BACKGROUND ART

As apparatuses for preventing or removing the frosting, icing, clouding, and the like of window glass in vehicles such as automobiles, defrosters are widely used. With a defroster, for example, warm air comprising no steam is intensively blown into a place where dehumidification is desired, to remove clouding to ensure visibility.

In recent years, for the purpose of the improvement of heating efficiency, power saving in electric vehicles, and the like, a defroster using a heating wire (electrically heated wire) has been required. With a defroster in this form, clouding can be removed, for example, by warming glass by a heating wire interposed between glass plates.

It is known that when a heating wire is interposed between glass plates in such a defroster, a polyvinyl acetal resin (for example, a polyvinyl butyral resin) having high light transmission properties is used as a glass intermediate film. For example, Patent Literature 1 (JP2018-35036A) discloses that regarding a glass apparatus for a vehicle comprising a pair of glass substrates, and a transparent resin intermediate film and a heating electrode sheet interposed between the glass substrates, a polyvinyl butyral resin is used as the transparent resin intermediate film.

As a heating wire for a defroster, a tungsten wire is generally used. However, a tungsten wire is thick having a wire diameter of about 30 μm and also difficult to thin and therefore provides poor visibility.

In order to address such a problem, it is proposed that instead of a tungsten wire, a copper pattern that can be formed into a thin wire be used as a heating wire. For example, Patent Literature 2 (JP2018-161889A) discloses that regarding a polyvinyl acetal resin film having a polyvinyl acetal resin layer, and an electrically conductive structure based on a metal foil, disposed on the surface or inside of the polyvinyl acetal resin layer, the electrically conductive structure is composed of copper or the like. In addition, Patent Literature 3 (JP2019-142763A) discloses that a laminate in which a polyvinyl acetal resin film and a copper foil are superposed is thermocompression-bonded to obtain the polyvinyl acetal resin film to which the copper foil is attached, and then the copper foil attached to the resin film is processed to form an electrically conductive layer. Further, Patent Literature 4 (WO2017/090386) discloses that in a laminate having a resin layer comprising a polyvinyl acetal resin and a copper layer, the copper layer is processed by a method such as a subtractive process, a semi-additive process, and a modified semi-additive process to form a wiring pattern.

Methods are known in which rust proofing treatment is performed on a copper foil surface using a solution comprising Zn, Ni, and the like, to prevent the deterioration of the copper foil. For example, Patent Literature 5 (JP2015-193884A) discloses that in Examples, rust proofing treatment composed of zinc-nickel alloy plating treatment and chromate treatment, and silane treatment with a silane coupling agent are performed in order on the roughening-treated layer of a carrier-attached copper foil as surface treatment. In addition, Patent Literature 6 (JP4354271B) discloses that in order to increase the rust proofing effect, chromate treatment is performed after zinc-nickel alloy plating treatment or zinc-cobalt alloy plating treatment.

CITATION LIST

Patent Literature

Patent Literature 1: JP2018-35036A
Patent Literature 2: JP2018-161889A
Patent Literature 3: JP2019-142763A
Patent Literature 4: WO2017/090386
Patent Literature 5: JP2015-193884A
Patent Literature 6: JP4354271B

SUMMARY OF INVENTION

Regarding the formation of a laminate comprising a polyvinyl acetal resin film and a copper foil as disclosed in Patent Literature 3, a polyvinyl acetal resin is a thermoplastic resin, and the lamination of the copper foil and the resin film needs to be performed under the conditions of low temperature and low pressure (for example, 180° C. or less and 0.6 MPa or less) for a short time (for example, several tens of seconds or less). Therefore, a polyvinyl acetal resin results in low reactivity with a copper foil, and it is difficult to ensure adhesion between the copper foil and the resin film.

The present inventors have now found that by attaching or forming a polyvinyl acetal resin film on a copper foil having a treated surface on which the amount of metal components is controlled in a predetermined range, it is possible to manufacture a laminate excellent in adhesion between the copper foil and the resin film.

Therefore, it is an object of the present invention to manufacture a laminate that is excellent in adhesion between the copper foil and the resin film while using a polyvinyl acetal resin having low reactivity with the copper foil.

According to an aspect of the present invention, there is provided a method for manufacturing a laminate, comprising the steps of:

provides a copper foil having on at least one side a treated surface on which an amount of metal components is 30 atomic % or more and 40 atomic % or less, and attaching or forming a polyvinyl acetal resin film on the treated surface of the copper foil to form a laminate, wherein the amount of metal components is a proportion of Cr, Ni, Cu, Zn, Mo, Co, W, and Fe in a total amount of N, O, Si, P, S, Cl, Cr, Ni, Cu, Zn, Mo, Co, W, and Fe when the treated surface is subjected to elemental analysis by X-ray photoelectron spectroscopy (XPS).

According to another aspect of the present invention, there is provided a method for manufacturing a heating element, comprising the steps of:

providing a laminate manufactured by the above method, processing the copper foil of the laminate to form a heating wire having a predetermined pattern, and attaching or forming an additional polyvinyl acetal resin film on the laminate in which the heating wire is formed, so as to sandwich the heating wire, to form a heating element.

According to another aspect of the present invention, there is provided a defroster comprising a heating element manufactured by the above method.

DESCRIPTION OF EMBODIMENTS

Definitions

The definitions of terms or parameters used for specifying the present invention are shown below.

"The amount of metal components" herein means the proportion (atomic %) of Cr, Ni, Cu, Zn, Mo, Co, W, and Fe in the total amount of N, O, Si, P, S, Cl, Cr, Ni, Cu, Zn, Mo, Co, W, and Fe when the treated surface of a copper foil is subjected to elemental analysis by X-ray photoelectron spectroscopy (XPS). The measurement of the amount of metal components on the treated surface of a copper foil by XPS can be preferably performed based on the measurement conditions and the analysis conditions shown in Examples described later.

The "developed interfacial area ratio Sdr" or "Sdr" herein is a parameter representing how much the developed area (surface area) of a definition area increases with respect to the area of the definition area, measured in accordance with ISO 25178. The developed interfacial area ratio Sdr is herein represented as an increase (%) in surface area. As this value becomes smaller, it is indicated that the surface shape is closer to flatness. The Sdr of a completely flat surface is 0%. On the other hand, as this value becomes larger, it is indicated that the surface shape is more uneven. For example, when the Sdr of a surface is 4.00%, it is indicated that the surface area of this surface increases from that of a completely flat surface by 4.00%.

The "root mean square height Sq" or "Sq" herein is a parameter corresponding to the standard deviation of distances from an average surface, measured in accordance with ISO 25178. The concept of the root mean square height Sq is close to that of average roughness, but the root mean square height Sq is easy to statistically handle and less likely to be influenced by dust and flaws present on a measurement surface, and disturbances such as noise, and therefore a stable result can be obtained.

The "density of peaks Spd" or "Spd" herein is a parameter representing the number of peaks per unit area, measured in accordance with ISO 25178. The density of peaks Spd can be obtained by counting only peaks larger than 5% of the maximum amplitude of a contour curved surface and dividing the number of peaks included in the contour curved surface by the projected area of the contour curved surface. When this value is large, it is suggested that the number of contact points with another object is large.

The developed interfacial area ratio Sdr, the root mean square height Sq, and the density of peaks Spd can each be calculated by measuring the surface profile of a predetermined measurement area (for example, a two-dimensional region of $16384\,\mu m^2$) on a treated surface by a commercially available laser microscope. The numerical values of the developed interfacial area ratio Sdr and the root mean square height Sq herein are values measured under conditions in which the cutoff wavelength of an S-filter is $0.55\,\mu m$, and the cutoff wavelength of an L-filter is $10\,\mu m$. The numerical value of the density of peaks Spd herein is a value measured under conditions in which the cutoff wavelength of an S-filter is $2\,\mu m$, and the cutoff of an L-filter is not performed.

Method for Manufacturing Laminate

The present invention relates to a method for manufacturing a laminate. The method of the present invention comprises the steps of (1) providing a copper foil having on at least one side a treated surface on which the amount of metal components is 30 atomic % or more and 40 atomic % or less, and (2) attaching or forming a polyvinyl acetal resin film (hereinafter sometimes simply referred to as a "resin film") on the treated surface of the copper foil. By attaching or forming a polyvinyl acetal resin film on a copper foil having a treated surface on which the amount of metal components are controlled in the predetermined ranges as such, a laminate excellent in adhesion between the copper foil and the resin film can be manufactured.

Generally, in the fabrication of a copper-clad laminate used for the manufacture of a printed wiring board, and the like, a copper foil and a prepreg (a composite material in which a substrate is impregnated with a thermosetting resin) are pressed under the conditions of high temperature and high pressure (for example, 220° C. and 4 MPa) for a long time (for example, 90 minutes). Thus, the resin can be allowed to sufficiently bite into the copper foil, and the adhesion between the copper foil and the resin can be ensured.

On the other hand, as described above, a polyvinyl acetal resin is a thermoplastic resin having high light transmission properties used as a glass intermediate film, and the lamination of a copper foil and a resin film needs to be performed under the conditions of low temperature and low pressure (for example, 180° C. or less and 0.6 MPa or less) for a short time (for example, several tens of seconds or less). Therefore, a polyvinyl acetal resin has low reactivity with a copper foil, and it has been difficult to ensure adhesion between the copper foil and the resin film. The present inventors have studied this problem and, as a result, found that the chemical properties of the treated surface of a copper foil influence the biting of a polyvinyl acetal resin. Then, the present inventors have found that by selectively using a copper foil in which the amount of metal components on a treated surface is 30 atomic % or more and 40 atomic % or less, the infiltration properties (wetting and spreading) of a polyvinyl acetal resin into the copper foil improve, and a polyvinyl acetal resin film can be allowed to effectively bite into the copper foil. This mechanism is not necessarily certain but is inferred as follows. A polyvinyl acetal resin is a resin obtained by acetalizing a polyvinyl alcohol-based resin such as polyvinyl alcohol or an ethylene vinyl alcohol copolymer at a predetermined degree of acetalization and has in the structural formula an OH group (hydroxy group) derived from a polyvinyl alcohol-based resin. On the other hand, metals derived from the above-described rust proofing treatment and the like are present on the surface of a copper foil in the state of oxides. In this respect, it is known that OH groups are present on the surfaces of metal oxides, and it is considered that these OH groups contribute to the improvement of the infiltration properties (wetting and spreading) of a polyvinyl acetal resin into a copper foil. Therefore, by using a copper foil having a treated surface on which the amount of metal components is as large as 30 atomic % or more (in other words, many OH groups are present), a laminate excellent in adhesion between the copper foil and the resin film can be manufactured. On the other hand, unavoidable impurities derived from contamination and the like, oxide-derived 0, and the like are present on the treated surface of a copper foil, and therefore the amount of metal components on the treated surface is practically 40 atomic % or less.

(1) Provision of Copper Foil

The copper foil used in the method of the present invention has a treated surface on at least one side. On this treated surface, the amount of metal components is 30 atomic % or more and 40 atomic % or less, preferably 33 atomic % or more and 40 atomic % or less, and more preferably 37 atomic % or more and 40 atomic % or less. When the amount of metal components is within such a range, OH groups contributing to the infiltration properties (wetting and spreading) of a polyvinyl acetal resin into the copper foil are sufficiently present on the treated surface of the copper foil, and the adhesion between the copper foil and the resin film can be improved.

The treated surface of the copper foil preferably comprises an oxide of at least one metal selected from the group consisting of Cr, Ni, Cu, Zn, Mo, Co, W, and Fe, more preferably an oxide of at least one metal selected from the group consisting of Cr, Ni, Cu, Zn, Mo, Co, and Fe, further preferably an oxide of at least one metal selected from the group consisting of Cr, Ni, Cu, Zn, Mo, and Fe, and particularly preferably an oxide of at least one metal selected from the group consisting of Cr, Ni, Cu, and Zn. OH groups (hydroxy groups) are typically present on the surfaces of oxides of these metals, and therefore the adhesion between the copper foil and the resin film can be even more effectively improved.

The amount of metal components on the treated surface can be controlled by subjecting a copper foil to surface treatment (for example, rust proofing treatment) under known or desired conditions. That is, by performing surface treatment on a copper foil using a solution or the like comprising Cr, Ni, Cu, Zn, Mo, Co, W, Fe, or a combination thereof, these metals or alloys can be fixed to the copper foil surface to increase the amount of metal components on the treated surface. On the other hand, when surface treatment is performed using a solution or the like not comprising the predetermined metals, the amount of metal components on the treated surface can decrease. Therefore, by appropriately changing the type, concentration, and the like of the solution used for the surface treatment, a treated surface satisfying the above range of the amount of metal components can be preferably formed. Alternatively, a commercially available copper foil having a treated surface satisfying the above range of the amount of metal components may be selectively obtained.

The surface treatment can be various types of surface treatments performed in order to improve or provide some kind of properties (for example, rust proofing properties, moisture resistance, chemical resistance, acid resistance, heat resistance, and adhesion to a resin film) on the surface of a copper foil. Examples of the surface treatment performed on a copper foil include rust proofing treatment, silane treatment, and roughening treatment, and the like. The surface treatment may be performed on at least one surface of a copper foil or both surfaces of a copper foil. Anyway, the copper foil may have treated surfaces on both sides or may have a treated surface only on one side.

The surface treatment preferably comprises rust proofing treatment. Examples of the rust proofing treatment include zinc-nickel alloy plating treatment, zinc-cobalt alloy plating treatment, iron-zinc alloy plating treatment, and chromate treatment. The rust proofing treatment should be performed by adopting the conditions disclosed in Patent Literature 5 or Patent Literature 6 as they are, or appropriately changing the conditions.

The treated surface of the copper foil preferably comprises a plurality of roughening particles. In other words, the surface treatment preferably comprises roughening treatment. Particularly, when the treated surface has a fine uneven shape (small nodules), the infiltration properties (wetting and spreading) of a polyvinyl acetal resin into the copper foil improve, and a polyvinyl acetal resin film can be allowed to even more effectively bite into the copper foil.

The treated surface of the copper foil preferably has a developed interfacial area ratio Sdr of 0.50% or more and 9.00% or less, more preferably 2.50% or more and 9.00% or less, and further preferably 5.00% or more and 9.00% or less. When the developed interfacial area ratio Sdr is within such a range, the surface area of the treated surface contributing to adhesion to a resin film can also be increased while the treated surface has small nodules suitable for the infiltration of a polyvinyl acetal resin, and therefore the adhesion between the copper foil and the resin film can be even more improved.

The treated surface of the copper foil preferably has a root mean square height Sq of 0.010 μm or more and 0.200 μm or less, more preferably 0.050 μm or more and 0.180 μm or less, and further preferably 0.100 μm or more and 0.140 μm or less. When the root mean square height Sq is within such a range, the treated surface of the copper foil has small nodules suitable for the infiltration of a polyvinyl acetal resin, and the adhesion between the copper foil and the resin film can be improved.

The treated surface of the copper foil preferably has a density of peaks Spd of 100 $mm^{-2}$ or more and 26000 $mm^{-2}$ or less, more preferably 10000 $mm^{-2}$ or more and 20000 $mm^{-2}$ or less, and further preferably 10000 $mm^{-2}$ or more and 15000 $mm^{-2}$ or less. When the density of peaks Spd is within such a range, a polyvinyl acetal resin even more easily infiltrates the copper foil surface, and the contact points between the copper foil and a resin film can also be increased, and therefore the adhesion between the copper foil and the resin film can be even more improved.

The thickness of the copper foil is not particularly limited but is preferably 0.1 μm or more and 35 μm or less, more preferably 0.3 μm or more and 18 μm or less, and further preferably 1.0 μm or more and 12 μm or less. The copper foil may be provided in the form of a carrier-attached copper foil in order to improve the handleability. The carrier-attached copper foil typically comprises a carrier, a release layer provided on this carrier, and a copper foil provided on this release layer with the treated surface on the outside. However, for the carrier-attached copper foil, a known layer configuration can be adopted as long as the amount of metal components on the outside surface of the copper foil satisfies the above range.

(2) Attachment or Formation of Resin Film on Copper Foil

A polyvinyl acetal resin film is attached to or formed on the treated surface of the copper foil provided in the (1) to form a laminate. The attachment of the resin film to the copper foil is preferably performed by thermocompression-bonding or adhering a previously provided resin film to the copper foil. Preferably, the attachment of the resin film to the copper foil is performed by thermocompression-bonding the resin film and the copper foil at a temperature of 180° C. or less and a pressure of 0.6 MPa or less, more preferably at a temperature of 100° C. or more and 150° C. or less and a pressure of 0.2 MPa or more and 0.6 MPa or less. This thermocompression bonding is preferably performed in 60 seconds or less, more preferably 10 seconds or more and 30 seconds or less. As described above, according to the method of the present invention, a laminate excellent in adhesion between the copper foil and the resin film can be manufactured even under the lamination conditions of such low temperature and low pressure.

On the other hand, the formation of the resin film on the copper foil is preferably performed by covering or coating the copper foil with the resin composition constituting the resin film, using a known method such as a melt extrusion process, a casting process, or a coating process. Thus, the resin film can be directly formed (formed in situ) on the copper foil. For example, when the resin film is directly formed on the copper foil by a melt extrusion process, the resin temperature during extrusion is preferably 250° C. or less, more preferably 150° C. or more and 230° C. or less, from the viewpoint of efficiently removing the volatile substance in the resin film.

The thickness of the resin film is not particularly limited but is preferably 1 μm or more and 1000 μm or less, more preferably 10 μm or more and 900 μm or less, and further preferably 80 μm or more and 900 μm or less. When the thickness of the resin film is within such a range, both good light transmission properties and conveyability (that is, the property of supporting a circuit (heating wire) obtained by processing the copper layer) can be achieved.

The resin film should comprise a polyvinyl acetal resin and may further comprise a known additive. Preferred examples of the polyvinyl acetal resin included in the resin film include polyvinyl butyral resins from the viewpoint of penetration impact resistance, transparency, and the like as a glass intermediate film. Examples of the additive that can be included in the resin film include a plasticizer, an anti-oxidant, an ultraviolet absorbing agent, and an adhesion modifier, and the like. Anyway, for the resin film, a commercially available polyvinyl acetal resin film may be used as it is, or the resin film may be fabricated by adopting an already known method for manufacturing a polyvinyl acetal resin film (for example, see Patent Literatures 2 and 3) as it is, or appropriately changing the method.

The peel strength between the copper foil and the resin film in the laminate is preferably 0.60 kgf/cm or more, more preferably 0.8 kgf/cm or more, and further preferably 1.0 kgf/cm or more when the circuit height is 12 μm and the circuit width is 3 mm. It is better that the peel strength is high. Its upper limit value is not particularly limited but is typically 3.0 kgf/cm or less. The measurement of the peel strength can be preferably performed in accordance with the A method (90° peel) of JIS C 5016-1994 according to the procedure shown in Examples described later. When the thickness of the copper foil is less than 12 μm, the peel strength should be measured after copper plating is performed until the copper foil reaches a thickness of 12 μm. On the other hand, when the thickness of the copper foil exceeds 12 μm, the measurement of the peel strength should be performed after etching is performed until the copper foil reaches a thickness of 12 μm.

Method for Manufacturing Heating Element

The laminate manufactured by the method of the present invention is preferably used for the formation of a heating element. That is, according to a preferred aspect of the present invention, a method for manufacturing a heating element is provided. This method comprises the steps of providing a laminate manufactured by the above method, processing the copper foil of the laminate to form a heating wire having a predetermined pattern, and attaching or form-ing an additional polyvinyl acetal resin film on the laminate in which the heating wire is formed, so as to sandwich the heating wire, to form a heating element.

The processing of the copper foil should be performed based on a known method and is not particularly limited. For example, a method such as a subtractive process, a semi-additive process, and a modified semi-additive process, as disclosed in Patent Literature 4, can be used to form a heating wire having a predetermined pattern. The pattern of the heating wire preferably comprises at least one pattern selected from the group consisting of a linear shape, a wavy line shape, a lattice shape, and a net shape. From the viewpoint of the ensuring of a sufficient amount of heat generated and good visibility in the heating element, the ease of processing the copper foil, and the like, the wire width of the heating wire (wiring) is preferably 1 μm or more and 25 μm or less, more preferably 1 μm or more and 15 μm or less, and further preferably 1 μm or more and 5 μm or less. From the same viewpoint, the height (thickness) of the heating wire is preferably 1 μm or more and 25 μm or less, more preferably 1 μm or more and 15 μm or less, and further preferably 1 μm or more and 5 μm or less. Further, the proportion of the region in which the polyvinyl acetal resin film is not in contact with the heating wire (that is, the opening ratio), on the surface of the polyvinyl acetal resin film on the heating wire side is preferably 70% or more and 98% or less. Thus, even better visibility can be ensured in the heating element.

The attachment or formation of the additional polyvinyl acetal resin film on the laminate in which the heating wire is formed should follow the attachment or formation of the resin film on the copper foil described above. That is, the preferred aspects described above regarding the attachment or formation of the resin film on the copper foil also apply to the attachment or formation of the additional polyvinyl acetal resin film as they are.

Defroster

The laminate or the heating element manufactured by the method of the present invention is preferably used for the manufacture of a defroster. That is, according to a preferred aspect of the present invention, a defroster comprising a heating element manufactured by the above method is provided. The configuration of the defroster is not particularly limited, and a known configuration can be adopted except that the defroster comprises the above-described heating element. For example, the defroster of the present invention can be used in the form of laminated glass in which the heating element described above is attached to the surface or inside of window glass in a vehicle such as an automobile.

In this case, the heating wire constituting the heating element may be placed over the entire surface of the window glass or may be provided only in a particular region of the window glass. Anyway, according to the defroster of the present invention, the heating element can efficiently warm window glass and can prevent or remove frosting, icing, clouding, and the like.

EXAMPLES

The present invention will be more specifically described by the following examples.

Examples 1 to 7

Seven types of copper foils were provided, and resin films were attached to these copper foils to obtain laminates. The measurement of peel strength was performed using the obtained laminates. These are specifically as follows.

(1) Provision of Copper Foils

Seven types of copper foils (roughening-treated copper foils) were provided which comprised treated surfaces (roughening-treated surfaces) having the amount of metal components shown in Table 2 on at least one side. These copper foils were commercially available products or manu-factured by a known manufacturing method as disclosed in Patent Literature 5, Patent Literature 6, or the like. The thicknesses of the provided copper foils were 12 μm, and the Sdr of the treated surfaces was 7.21%, the Sq was 0.136 µm, and the Spd was 13000 mm$^{-2}$.

The parameters of the treated surfaces (roughening-treated surfaces) were measured in accordance with ISO 25178 using a laser microscope (manufactured by Olympus Corporation, OLS5000). Specifically, the surface profile of a region having an area of 16384 µm$^2$ on the treated surface of the copper foil was measured by the laser microscope by a 100× lens having a numerical aperture (N.A.) of 0.95. Noise removal and primary linear surface inclination correction were performed on the surface profile of the treated surface obtained, and then the measurement of Sdr, Sq, and Spd was carried out by surface property analysis. At this time, the measurement of Sdr and Sq was carried out with the cutoff wavelength of an S-filter being 0.55 µm and the cutoff wavelength of an L-filter being 10 µm. On the other hand, the measurement of Spd was carried out with the cutoff wavelength of the S-filter being 2 µm and the cutoff of the L-filter not performed.

For the amount of metal components, the proportion (atomic %) of Cr, Ni, Cu, Zn, Mo, Co, W, and Fe in the total amount of N, O, Si, P, S, Cl, Cr, Ni, Cu, Zn, Mo, Co, W, and Fe present on the treated surface is obtained as a semiquantitative value by measuring the treated surface of the copper foil by X-ray photoelectron spectroscopy (XPS). This measurement was performed based on the following measurement conditions and analysis conditions.

(Measurement Conditions)

Apparatus: X-ray photoelectron spectrometer (manufactured by ULVAC-PHI, Incorporated., Versa Probe III)

Excitation X-rays: monochromatic AI-Kα rays (1486.7 eV)

Output: 50 W

Acceleration voltage: 15 kV

X-ray irradiation diameter: a diameter of 200 µm

Measurement area: a diameter of 200 µm

Take off Angle: 45°

Pass energy: 26.0 eV

Energy step: 0.1 eV/step

Measured elements and orbitals (quantitatively calculated elements): They were as shown in Table 1.

TABLE 1

| Measured element | N | O | P | Si | S | Cl | Co | Ni | Zn | Cu | Cr | Fe | Mo | W |
|---|---|---|---|---|---|---|---|---|---|---|---|---|---|---|
| Measured spectrum | 1s | 2s | 2p | | 2p1 | | 2p3 | | | | 3p | | 3d | 4d |

(Analysis Conditions)

The analysis of the XPS data was performed using analysis software (manufactured by ULVAC-PHI, Incorporated., Multipak 9.9). For peak separation, Curve Fit in the analysis software was used, and for the background mode, Shirley was used. For charge correction, the binding energy of C1s was 284.8 eV.

(2) Attachment of Resin Film to Copper Foil

A commercially available polyvinyl butyral resin film (thickness: 760 µm) in which dihexyladipic acid was blended as a plasticizer was provided. The polyvinyl butyral resin film and the copper foil provided in the (1) were laminated on a copper-clad laminate having a thickness of 0.2 mm as a base at the time of peel measurement described later, so that the treated surface of the copper foil abutted the resin film. At this time, the copper foil and the resin film were thermocompression-bonded under the conditions of a temperature of 110° C., a pressure of 0.4 MPa, and a time of 20 seconds or less to obtain a laminate in which the copper foil and the resin film were attached.

(3) Evaluation of Laminate

For the laminate obtained above, the measurement of peel strength was performed as follows. First, a dry film was attached to the surface of the laminate on the copper foil side to form an etching resist layer. Then, exposure and development were performed on this etching resist layer to form a predetermined etching pattern. Subsequently, circuit etching was performed with a copper etchant, and the etching resist was stripped to obtain a circuit having a height of 12 µm and a width of 3 mm. The circuit thus obtained was peeled off from the resin film in accordance with the A method (90° peel) of JIS C 5016-1994, and the peel strength (kgf/cm) was measured. The results were as shown in Table 2.

TABLE 2

| | Amount of metal components on copper foil surface (atomic %) | | | | | Evaluation of laminate |
|---|---|---|---|---|---|---|
| | Cr | Ni | Cu | Zn | Total amount | Peel strength (kgf/cm) |
| Ex. 1 | 5.7 | 12.5 | 8.2 | 12.1 | 38.5 | 1.16 |
| Ex. 2 | 5.8 | 14.6 | 7.6 | 8.8 | 36.8 | 0.86 |
| Ex. 3 | 5.9 | 12.8 | 5.4 | 9.4 | 33.4 | 0.90 |
| Ex. 4 | 4.9 | 13.0 | 4.5 | 11.0 | 33.5 | 0.80 |
| Ex. 5 | 5.0 | 10.8 | 5.8 | 9.4 | 31.0 | 0.61 |
| Ex. 6* | 5.6 | 12.2 | 3.4 | 7.3 | 28.4 | 0.51 |
| Ex. 7* | 5.0 | 11.7 | 3.4 | 7.0 | 27.2 | 0.38 |

*indicates a comparative example.

The invention claimed is:

1. A method for manufacturing a laminate, comprising:

providing a copper foil having on at least one side a treated surface on which an amount of metal components is 30 atomic % or more and 38.5 atomic % or less, and attaching or forming a polyvinyl acetal resin film on the treated surface of the copper foil to form a laminate, wherein the amount of metal components is a proportion of Cr, Ni, Cu, Zn, Mo, Co, W, and Fe in a total amount of N, O, Si, P, S, Cl, Cr, Ni, Cu, Zn, Mo, Co, W, and Fe when the treated surface is subjected to elemental analysis by X-ray photoelectron spectroscopy (XPS).

2. The method according to claim 1, wherein the amount of metal components is 33 atomic % or more and 38.5 atomic % or less.

3. The method according to claim 1, wherein the amount of metal components is 37 atomic % or more and 38.5 atomic % or less.

4. The method according to claim 1, wherein the treated surface comprises an oxide of at least one metal selected from the group consisting of Cr, Ni, Cu, Zn, Mo, Co, W, and Fe.

5. The method according to claim 1, wherein the treated surface has a developed interfacial area ratio Sdr of 0.50% or more and 9.00% or less and a root mean square height Sq of 0.010 µm or more and 0.200 µm or less, and wherein the Sdr and Sq are values measured in accordance with ISO 25178 under conditions in which a cutoff wavelength of an S-filter is 0.55 μm, and a cutoff wavelength of an L-filter is 10 μm.

6. The method according to claim 1, wherein the treated surface has a density of peaks Spd of 100 mm$^{-2}$ or more and 26000 mm$^{-2}$ or less, and wherein the Spd is a value measured in accordance with ISO 25178 under conditions in which a cutoff wavelength of an S-filter is 2 μm, and cutoff of an L-filter is not performed.

7. The method according to claim 1, wherein the treated surface comprises a plurality of roughening particles.

8. The method according to claim 1, wherein attachment of the resin film to the copper foil is performed by thermo-compression-bonding the resin film and the copper foil at a temperature of 180° C. or less and a pressure of 0.6 MPa or less.

9. The method according to claim 1, wherein the resin film has a thickness of 1 μm or more and 1000 μm or less.

10. The method according to claim 1, wherein the polyvinyl acetal resin is a polyvinyl butyral resin.

11. A method for manufacturing a heating element, comprising:

providing a laminate manufactured by the method according to claim 1, processing the copper foil of the laminate to form a heating wire having a predetermined pattern, and attaching or forming an additional polyvinyl acetal resin film on the laminate in which the heating wire is formed, so as to sandwich the heating wire, to form a heating element.

12. The method according to claim 11, wherein the predetermined pattern comprises at least one pattern selected from the group consisting of a linear shape, a wavy line shape, a lattice shape, and a net shape.

13. A defroster comprising a heating element manufactured by the method according to claim 11.

* * * * *